United States Patent
Moroney et al.

(10) Patent No.: US 6,822,762 B2
(45) Date of Patent: Nov. 23, 2004

(54) LOCAL COLOR CORRECTION

(75) Inventors: Nathan M. Moroney, Palo Alto, CA (US); Raymond G Beausoleil, Redmond, WA (US); Irwin Sobel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 10/136,966

(22) Filed: May 2, 2002

(65) Prior Publication Data

US 2002/0186387 A1 Dec. 12, 2002

Related U.S. Application Data

(63) Continuation-in-part of application No. 09/540,162, filed on Mar. 31, 2000.

(51) Int. Cl.[7] .............................. H04N 1/60; G06T 5/00; G06F 1/02
(52) U.S. Cl. ..................... 358/1.9; 358/518; 358/519; 358/521; 382/167; 708/277
(58) Field of Search ................. 358/518, 1.9, 520, 358/3.21, 3.27, 519, 521, 530, 532, 523; 382/167, 254, 274, 162, 260, 264; 348/582, 649, 651, 458, 453, 455, 581; 345/582–609; 708/277

(56) References Cited

U.S. PATENT DOCUMENTS

| | | | |
|---|---|---|---|
| 4,959,711 A | * 9/1990 | Hung et al. | 358/523 |
| 5,038,216 A | 8/1991 | Easterly et al. | |
| 5,065,234 A | * 11/1991 | Hung et al. | 358/523 |
| 5,189,529 A | * 2/1993 | Ishiwata et al. | 358/451 |
| 5,467,412 A | * 11/1995 | Capitant et al. | 382/167 |
| 5,793,885 A | 8/1998 | Kasson | |
| 5,978,107 A | * 11/1999 | Murai et al. | 358/520 |
| 6,333,762 B1 | * 12/2001 | Yoo et al. | 348/441 |
| 2002/0186387 A1 | * 12/2002 | Moroney et al. | 358/1.9 |
| 2003/0038957 A1 | * 2/2003 | Sharman | 358/1.9 |
| 2003/0058464 A1 | * 3/2003 | Loveridge et al. | 358/1.9 |
| 2003/0142865 A1 | * 7/2003 | Hirota et al. | 382/167 |
| 2003/0161547 A1 | * 8/2003 | Luo | 382/274 |
| 2004/0013298 A1 | * 1/2004 | Choe et al. | 382/167 |

OTHER PUBLICATIONS

Myler, Harley, R.; Weeks, Arthur, R.; "The Pocket Handbook of Image Processing Algorithms in C", 1993, Prentice Hall P T R, pp. 82–83.*

Moroney, Local color correction using non–linear masking, IS&T SID 8th Color Imaging Conference, 2000.*

* cited by examiner

Primary Examiner—Scott Rogers

(57) ABSTRACT

An input image represented by a set of input pixel values is color-corrected by locally modifying the input pixel values according to pixel neighborhoods; and determining an output image having a set of output pixel values. Each set of output pixel values equals a non-linear combination of a set of input pixel values and its corresponding set of modified pixel values.

44 Claims, 7 Drawing Sheets

LOCAL COLOR CORRECTION

CROSS REFERENCE TO RELATED APPLICATION

This is a continuation-in-part application of U.S. Ser. No. 09/540,162 filed Mar. 31, 2000 and entitled METHOD AND APPARATUS FOR PERFORMING LOCAL COLOR CORRECTION.

BACKGROUND

Color tone reproduction is an important aspect of image processing. Historically, tone correction has been performed on a global basis for a given image. Global tone-correction operations traditionally apply the same correction to all the pixels of an image. In other words, each input value is mapped to one and only one output value.

Global tone correction results in a reasonable correction when the dynamic range of the original image is fairly limited. When the original image has a large dynamic range, it becomes increasingly difficult to perform a global tone correction that will accommodate both shadow and highlight detail.

Consequently, several local tone-correction operations have been proposed for processing images with high dynamic range. A local tone-correction operation typically maps one input value to different output values, depending on the values of the neighboring pixels. This allows for simultaneous shadow and highlight adjustments.

Prior art local-tone correction techniques include manual operations, such as dodging and burning, and automated techniques, such as histogram equalization, piece-wise gamma correction, and Retinex processes. Some of these techniques are quite complex and time consuming. Others do not consistently provide acceptable quality.

SUMMARY

An input image represented by a set of input pixel values is color-corrected by locally modifying the input pixel values according to pixel neighborhoods; and determining an output image having a set of output pixel values. Each set of output pixel values equals a non-linear combination of a set of input pixel values and its corresponding set of modified pixel values. Other aspects and advantages of the present invention will become apparent from the following detailed description, taken in conjunction with the accompanying drawings, illustrating by way of example the principles of the present invention.

DETAILED DESCRIPTION

Figure 1:
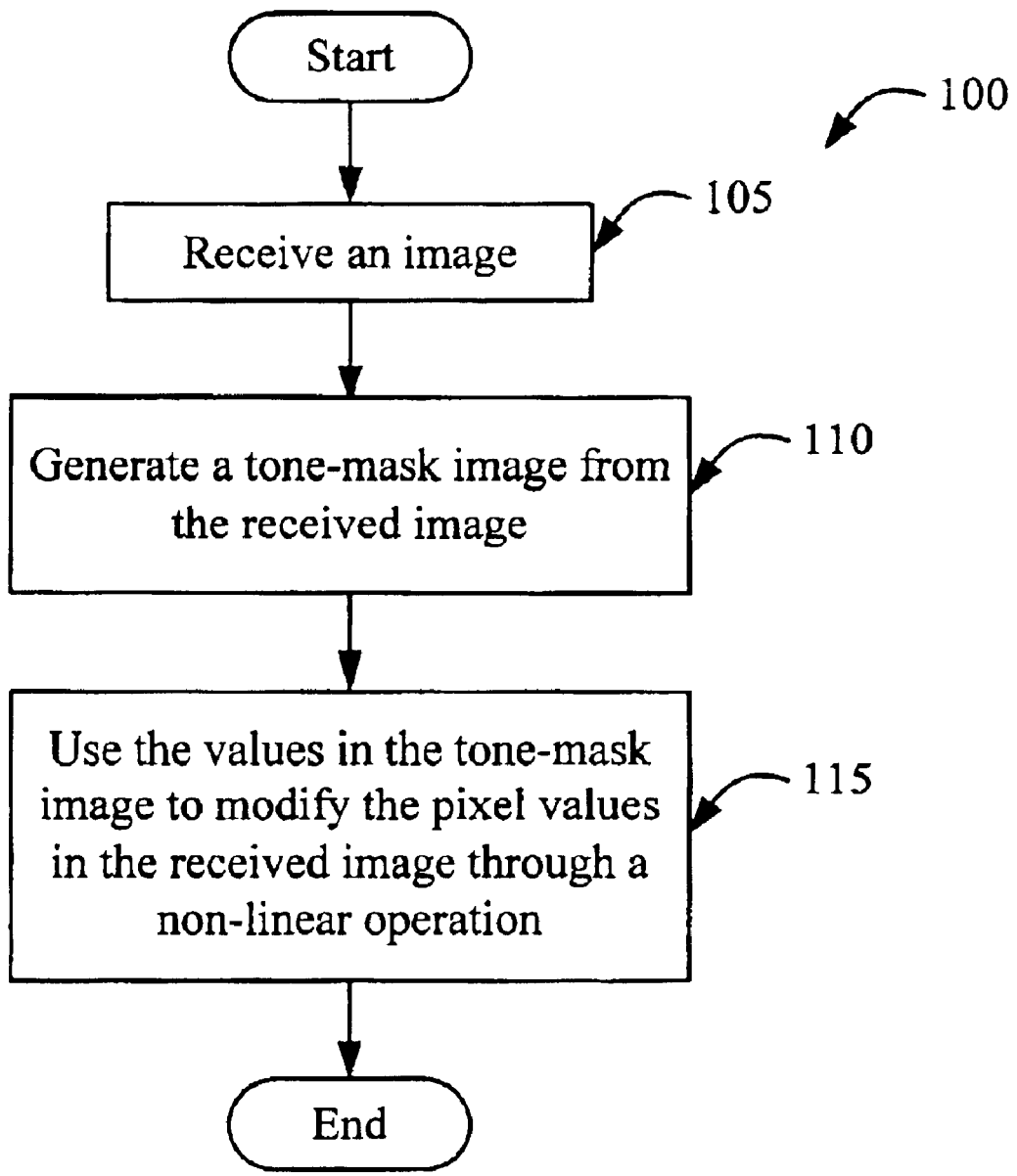
FIG. 1 illustrates a local color correction process that is used in some embodiments of the invention.

FIG. 1 illustrates a process 100 that is used in some embodiments of the invention. As shown in this figure, the process 100 initially receives (at 105) a digital color image that is formed by a number of pixels (i.e., picture elements). Specifically, in some embodiments, the process receives sets of component color values that represent the digital color image. Each set of the component color values specifies the color of a pixel of the digital image. In some embodiments of the invention, the component colors are the primary additive colors, red, green or blue ("RGB"). Other embodiments, however, use other component colors values (such as CMYK values, YCrCb values, CIELAB, CIECAM97s values, etc.) to specify the colors of the digital image's pixels.

As shown in FIG. 1, the process generates (at 110) a tone mask from the received digital image. A tone mask is an image that encodes the tone properties of the received digital image in an abbreviated form. In other words, the mask contains information about the color tone of the items in the received image, independent of the content or identity of the items. The numerical values in the tone mask are indicative of shadows, highlights, and midtones in the received digital image.

Like the received digital image, the tone mask image includes a number of pixels. The color of each pixel in the tone mask is specified by a mask color value. Each pixel in the tone mask image corresponds to a pixel in the digital image. Similarly, the mask color value of each pixel in the tone mask is associated with the component color values of the corresponding pixel in the digital image.

Different embodiments of the invention may use different techniques to generate the tone mask of the received digital image. Some embodiments generate this mask by performing an iterative operation on the received image. For instance, some embodiments may generate the mask by using an iterative process (such as a Retinex process) that makes assumptions about the human visual system. Other embodiments generate this mask by performing a non-iterative operation on the received image. For example, some embodiments perform a low-pass filtering operation on the received image to generate this mask. One such approach is described below by reference to FIG. 2.

As shown in FIG. 1, after process 100 generates the tone mask image, the process uses (at 115) the values in the tone mask to modify the pixel color values in the received image through a non-linear operation. The non-linear application of the mask provides a gradual transition for the high contrast boundaries in the received image.

Different embodiments of the invention use different non-linear operations to modify the pixel color values with the mask values. Some embodiments use rotated, scaled sinusoidal functions, while others use sigmoidal functions.

Yet other embodiments employ exponential functions that have the mask values as part of their exponent and the pixel values as part of their base. One such exponential operator is described further below by reference to FIG. 3.

Figure 2:
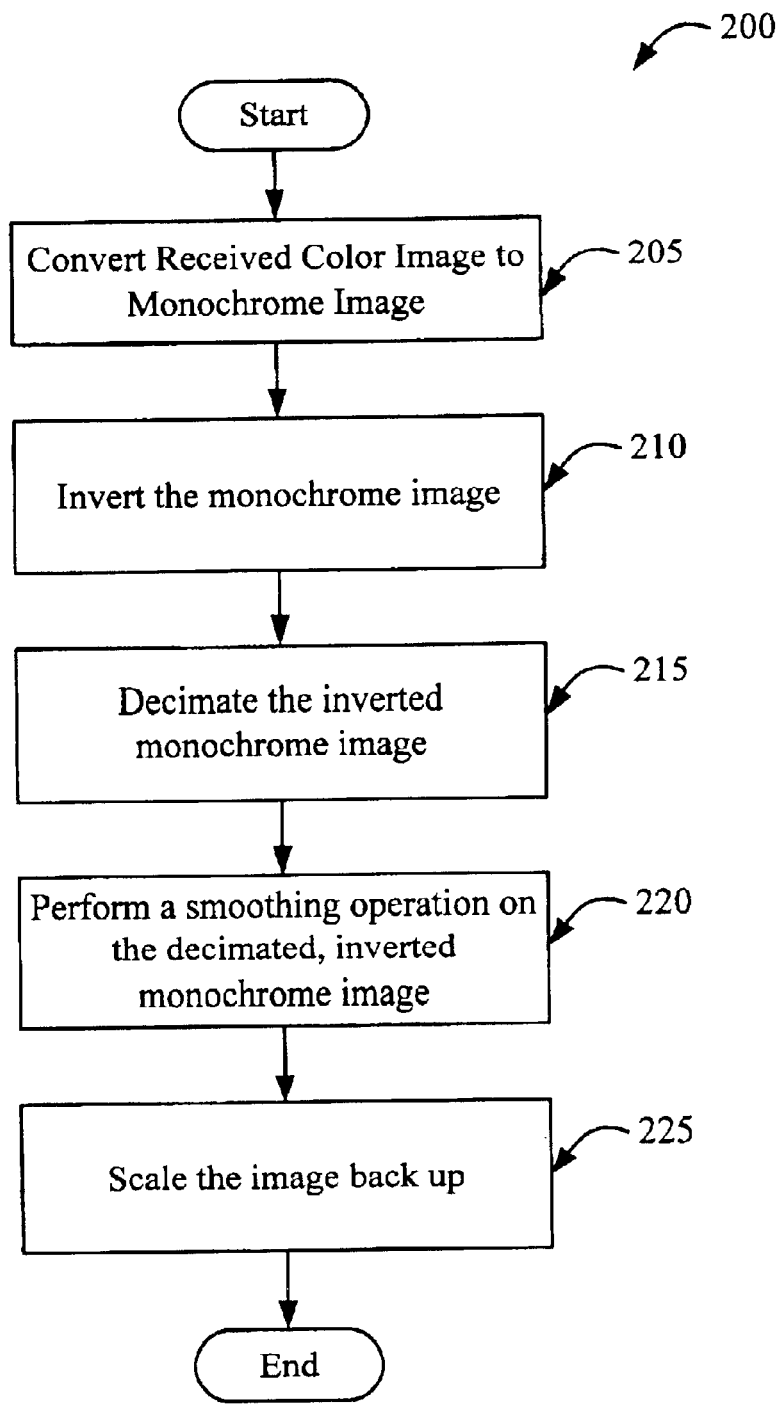
FIG. 2 illustrates a process for generating a tone mask through a low-pass filtering operation.

FIG. 2 illustrates a process 200 for generating a tone mask through a low-pass filtering operation. As shown in this figure, the process initially converts (at 205) the received color image to a monochrome image (i.e., an image that only contains black and white pixel values, or contains black, white, and gray values). One way of generating a monochrome image would be to use the color values for one color component (e.g., for green) and discard the remaining color values. Another approach would be to compute a non-linear average of the component color values by using a scaling equation (such as 0.2R+0.7G+0.1B).

Next, the process inverts (at 210) the monochrome image. In other words, the process subtracts each pixel value from the maximum digital count, so that white values become black values, black values becomes white values, most gray values assume new gray values, and the mid-gray value remains the same. The process then decimates (at 215) the inverted monochrome image. Some embodiments decimate this image by selecting every $n^{th}$ (e.g., $20^{th}$) horizontal and vertical pixel in this image (i.e., selecting the pixel color value for every $n^{th}$ pixel in the horizontal and vertical directions), and discarding the remaining pixels.

The process then performs (at 220) a smoothing operation on each pixel in the decimated, inverted, monochrome image. In some embodiments, this smoothing operation is a 3×3 convolution operation with a ⅑ kernel. In essence, such a convolution operation would replace each pixel value by the average value that is obtained by averaging a 3×3 pixel-neighborhood around the pixel.

Finally, the process scales (at 225) the smoothed, decimated, inverted, monochrome image back up to the resolution of the original received image. In some embodiments, the process performs this scaling operation by selecting each pixel value in the smoothed, decimated, inverted image as the pixel value for a n by n (e.g., 20 by 20) pixel area. The combination of the decimation, smoothing, and scaling operations provide the low-pass filtering operation of the process 200. The result is a tone mask in which there are no fine details and only large indistinct regions are visible.

The mask produced by process 200 is monochrome in order to avoid distorting the chroma of the image. This mask is inverted so that the power of the exponent for the combination operation is the opposite of the input value. For example, a light region in the received image will have a darker mask value (i.e., a higher mask value) and therefore will be darkened. Other embodiments of the invention do not invert the original image to generate the tone mask. Instead, these embodiments account for the need for inversion in the non-linear operator that is used to combine the mask with the received image.

In addition, the mask may be decimated and then smoothed in order to speed up the process for generating the mask. Some embodiments of the invention, however, do not decimate the inverted monochrome image to generate a thumbnail image that can be quickly smoothed. Instead, these embodiments perform the smoothing operation directly on the inverted monochrome image.

The mask produced by process 200 is low-pass filtered (i.e., blurred) because otherwise the mask would flatten the contrast in the image. In other words, when the mask image is not blurred, then the non-linear combination of the mask and the received image will result in an image with a reduced image contrast. On the other hand, if the mask is overly blurred, then the process reduces to simple gamma correction, and the local tone correction has less of an effect.

Figure 3:
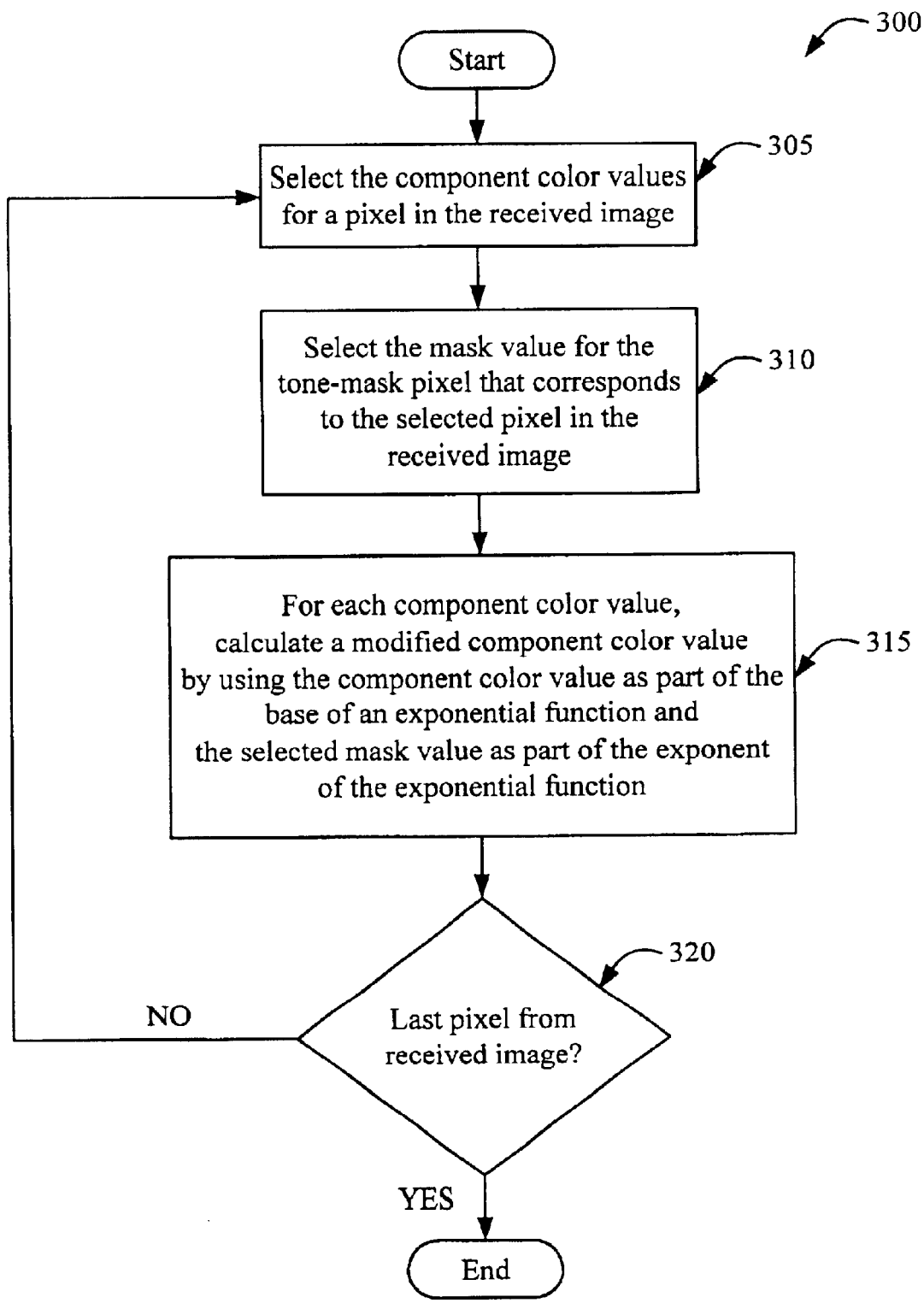
FIG. 3 illustrates a process for combining pixel values with their corresponding mask values from the tone mask through a non-linear, exponential operation.

FIG. 3 illustrates a process 300 for combining the pixel values with their corresponding mask values through a non-linear, exponential operation. Process 300 initially retrieves (at 305) the component color values for a pixel in the received digital image. The process then retrieves (at 310) from the tone mask a mask value that corresponds to the selected component color values. Next, the process uses an exponential function to calculate (at 315) a modified component color value for each retrieved component color value. In some embodiments, the process uses a retrieved component color value as part of the base of the exponential function, and uses the retrieved mask value as part of exponent of this function.

Finally, the process determines (at 320) whether it has modified all the pixel color values in the received image. If not, the process repeats for the next pixel by returning to 305, and selecting the next component color value set for the next pixel. Otherwise, the process terminates.

Some embodiments of the invention use the following Equation A as the exponential function for modifying the component color values by their corresponding mask values.

$$O = 255 * \left(\frac{I}{255}\right)^{\left(2^{\left(\frac{C1*M-C2}{C2}\right)}\right)} \tag{A}$$

In this equation, O represents the modified output color value, I represents an input component color value, M represents the mask value, and C1 and C2 represent constant values. Some embodiments of the invention use Equation A for pixel values of each component color. For instance, some embodiments use this equation on red, green, and blue values of each pixel in the received image, in order to obtain modified red, green, and blue values for all the image pixels.

The operation described by Equation A is essentially akin to a pixel-wise gamma correction (i.e., a pixel by pixel gamma correction), where each pixel has its own particular gamma value (due to its particular mask value) that is determined by the tonal properties of the pixel and its surrounding pixels. Equation A assumes an 8-bit image and therefore uses a value of 255 to scale the data. However, higher or lower bit-depth images could be used, in which case the scale value would correspond to the maximum digital count.

Each mask value that is inserted in Equation A defines a tone-reproduction curve. In other words, for each mask value, a tone-reproduction curve can be used to represent how Equation A maps the input component color values to modified output color values. Similarly, a family of tone-reproduction curves can be used to illustrate this equation's mapping of the input values to the modified output color values for all mask values.

Figure 4:
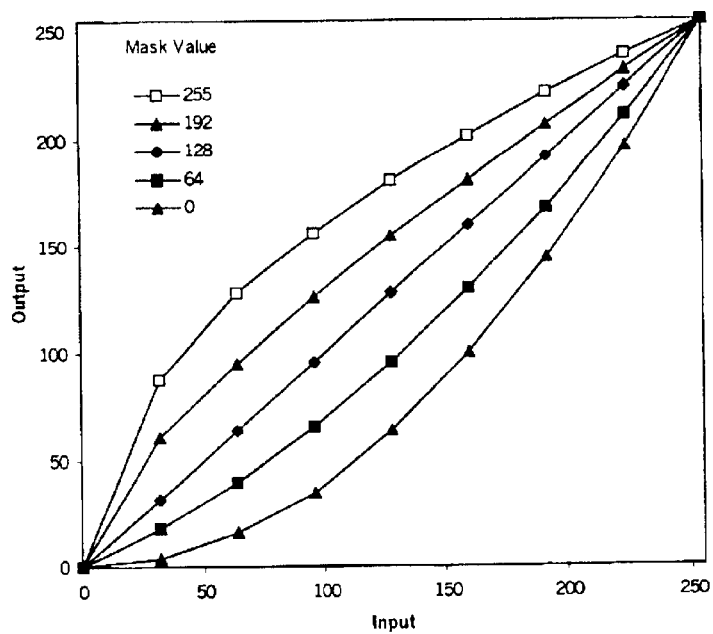
FIG. 4 illustrates several curves that show how pixel color values are mapped to output color values depending on the particular mask values.

FIG. 4 illustrates a family of tone-reproduction curves for the case where the constant C1 equal 1, constant C2 equals 128, and the mask values range from 0 to 255. In this figure, the x-axis is the input pixel value and the y-axis is the output value. The mask values are in the range 0 to 255 when an eight-bit color scheme is used (i.e., when each component color is represented by eight bits). In this example, mask values greater than 128 result in an exponent less than 1, while mask values less than 128 yield exponents greater than 1. Mask values equal to 128 result in exponents equal to 1 and does not change the input data.

The constants C1 and C2 determine the center and width of the family of tone-reproduction curves. Specifically, the constant C2 determines the center of the family of curves. In the example shown in FIG. 4, the center is the 45° line representing the mask value 128. The constant C1 determines the spreading of the curves in the family. Hence, changing the constant C2 moves the family of curves up or down, while changing the constant C1 spreads or contracts the family of curves.

Some interactive embodiments of the invention (1) allow their users to modify C1 and C2, and/or (2) automatically modify one or both of these constants based on the image properties. Modifying these constants changes the magnitude of the power function. Hence, such modifications change the degree of local tone correction performed by process 300 based on user preferences or image properties. For instance, if a received original image is very bright, a user can move up the family of tone-reproduction curves so that the process can darken the original image more in order to provide better contrast between the bright objects in the image.

Figure 5:
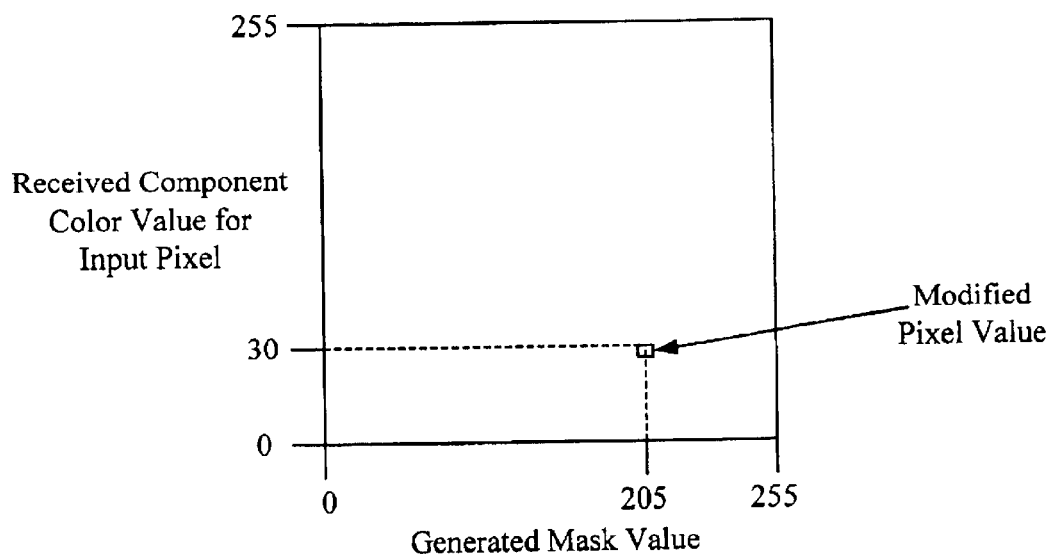
FIG. 5 presents a conceptual illustration of a two-dimensional look-up table that stores modified pixel color values.

Equation A can be implemented as a look up table, where the received pixel values and the generated mask values are used as indices into this table that identify the location of the pre-calculated modified pixel values for different combination of pixel and mask values. FIG. 5 presents a conceptual illustration of this approach.

Figure 6:
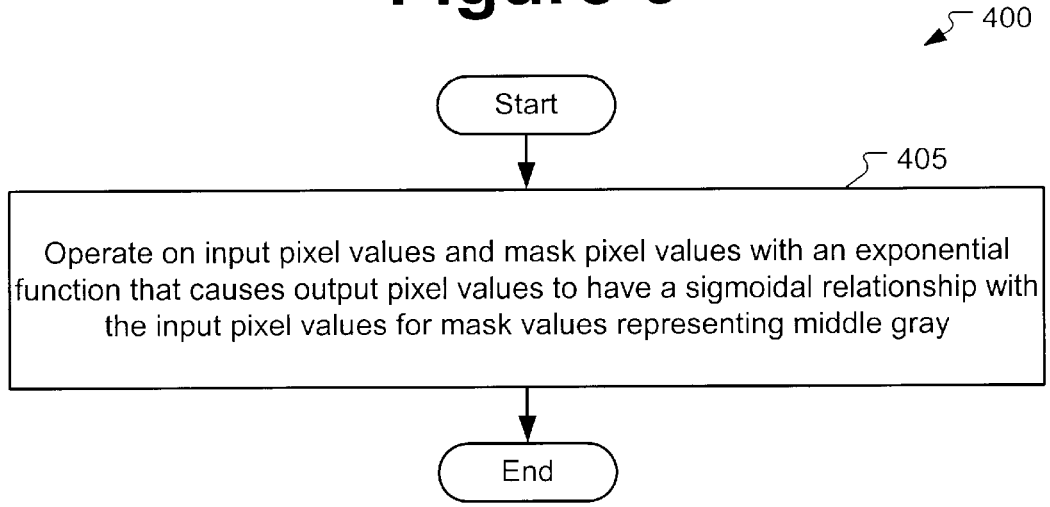
FIG. 6 illustrates a process for operating on input pixel values and mask pixel values to result in a sigmoidal relationship between output pixel values and input pixel values.

In other embodiments of the invention, other non-linear equations may be used to correct color of the input image. For example, FIG. 6 illustrates a process 400 for combining the input pixel values of each pixel of the input image with their corresponding mask pixel values through a non-linear, exponential operation. More specifically, in a number of embodiments, the input pixel values I and the mask pixel values M are operated on with an exponential function that causes the output pixel value O to have a sigmoidal relationship (i.e., an S-shaped tone-reproduction curve) with the input pixel values for a given mask value M that represents middle gray (at 405).

Figure 7:
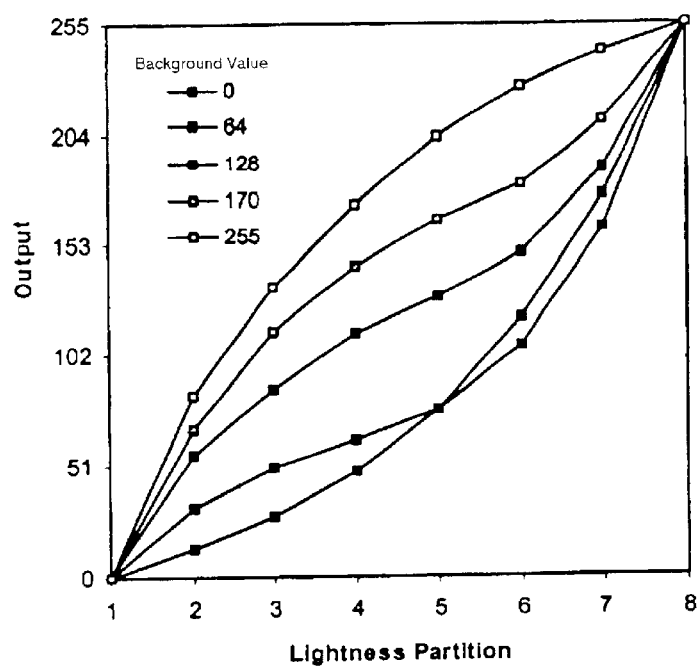
FIG. 7 illustrates several curves resulting from a psychophysical investigation of lightness perception as a function of background lightness.

The embodiments employing the sigmoidal relationship between the input and output pixel values for the middle gray region simulate human perception of light. More specifically, FIG. 7 illustrates the results from a psychophysical experiment that investigated a human's lightness perception as a function of five different uniform lightness backgrounds averaged for 15 observers. The x-axis is the lightness partition, and the y-axis is the matching digital count for that partition. The graph illustrates five curves each corresponding to different 8-bit backgrounds ranging from black (0) to shadows (64) to middle gray (128) to highlights (170) to white (255). As can be seen, the curves show both an exponential relationship and a sigmoidal relationship. More specifically, the curves for the extremes, i.e., black and white, are exponential in nature, while the curves for the middle tones, i.e., shadow, middle gray, and highlights, are sigmoidal or hyperbolic in nature.

In a number of embodiments, a substantially sigmoidal relationship may be generated with an exponential operation using input pixel values I as part of its base and its exponent, and using the corresponding set of mask pixel values M as part of its exponent. One example of such an exponential operation is Equation B:

$$O = T \cdot \left[1 - \left(1 - \frac{I}{T}\right)^{\left|\frac{I}{T} + \left(\frac{T-M}{T} + c\right)\right|}\right] \quad (B)$$

wherein O represents the output pixel value, c represents a constant value, and $T=2^n-1$, where T is the total number of possible pixel values.

In embodiments where the pixels are in 8-bit color (i.e., n=8), then T=255. Accordingly, Equation B becomes:

$$O = 255 \cdot \left[1 - \left(1 - \frac{I}{255}\right)^{\left|\frac{I}{255} + \left(\frac{255-M}{255} + c\right)\right|}\right]$$

Equation B involves a minuend and a subtrahend. The subtrahend may include the exponential operation in which the input pixel values I are part of the base and the exponent, and the corresponding mask pixel values M are part of the exponent. The minuend may include the constant T.

Figure 8:
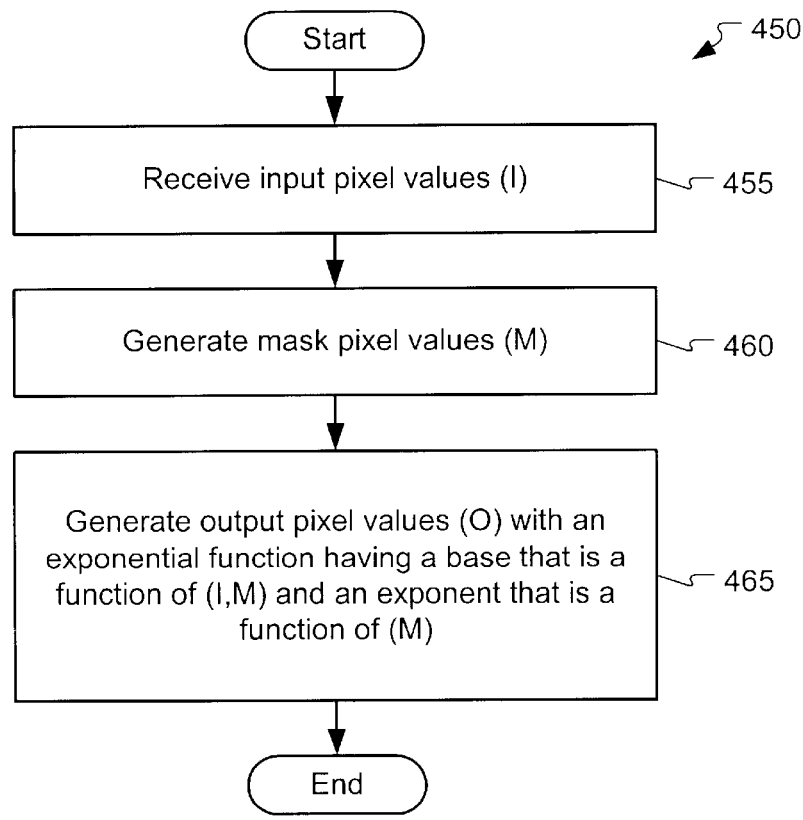
FIG. 8 illustrates a process for combining input pixel color values with their corresponding mask pixel values from the tone mask through an exponential operation.

FIG. 8 illustrates an example of a process 450 for causing a sigmoidal relationship in tone-reproduction curves. Upon receipt of the input pixel values I for each pixel of an input image (e.g., a received digital color image) (at 455), the process 450 may generate the corresponding mask pixel values M (at 460) for a tone mask. The process 450 may then generate output pixel values O with an exponential function having a base that is a function of both the input pixel values I and the mask pixel values M, and an exponent that is a function of the mask pixel values M (at 465), or:

$$O = k \cdot [f(I,M)]^{f(M)} \quad (C)$$

wherein k is a constant.

In a number of embodiments, the non-linear Equation C may include one or more parameters for adjusting the tone-reproduction curves, or:

$$O = k \cdot [f(I,M,p_1)]^{f(M, p_2)} \quad (D)$$

wherein $p_1$ and $p_2$ are variable parameters. One example of Equations C and D is:

$$O = T \cdot \left[\frac{|s-t|}{(1+s)(1-t)}\right]^b \quad (E)$$

wherein:

$T=2^n-1$ (n=number of bits)

$$s = \exp(u \cdot a) \quad (F)$$

$$t = \exp(-a) \quad (G)$$

$$b = \begin{cases} 1 + \frac{(c_2-1) \cdot v}{c_2} & v \leq 0 \\ 1 + (c_2-1) \cdot v & v \geq 0 \end{cases} \quad (G)$$

wherein:

$$a = c_1 - (c_1 - 1) \cdot |v| \quad (H)$$

$$u = \frac{I - \left(\frac{2^n}{2}\right)}{\left(\frac{2^n}{2}\right)} \quad (I)$$

$$v = \frac{M - \left(\frac{2^n}{2}\right)}{\left(\frac{2^n}{2}\right)} \qquad (J)$$

wherein:

$$c_1 = (-k_1 \cdot p_1^2) - (k_2 \cdot p_1) + 1 \qquad (K)$$

$$c_2 = (k_3 \cdot p_2^2) + (k_4 \cdot p_2) + 1 \qquad (L)$$

and wherein $k_1$, $k_2$, $k_3$, and $k_4$ are constants. Values for constants k that result in sigmoidal tone-reproduction curves have been determined and yield the following Equations K and L:

$$c_1 = (-0.0000151 \cdot p_1^2) - (0.0136487 \cdot p_1) + 1$$

$$c_2 = (0.0000311 \cdot p_2^2) - (0.0038292 \cdot p_2) + 1$$

Where 8-bit color is used (i.e., n=8), Equations I and J become:

$$u = \frac{I - 128}{128}$$

$$v = \frac{M - 128}{128}.$$

Accordingly, from Equation E, it can be said that b is a function of the mask pixel values M[i.e., b=ƒ(M)], t is a function of the mask pixel values M[i.e., t=ƒ(M)], and s is a function of the input pixel values I and the mask pixel values M[i.e., b=ƒ(I,M)].

Figure 9:
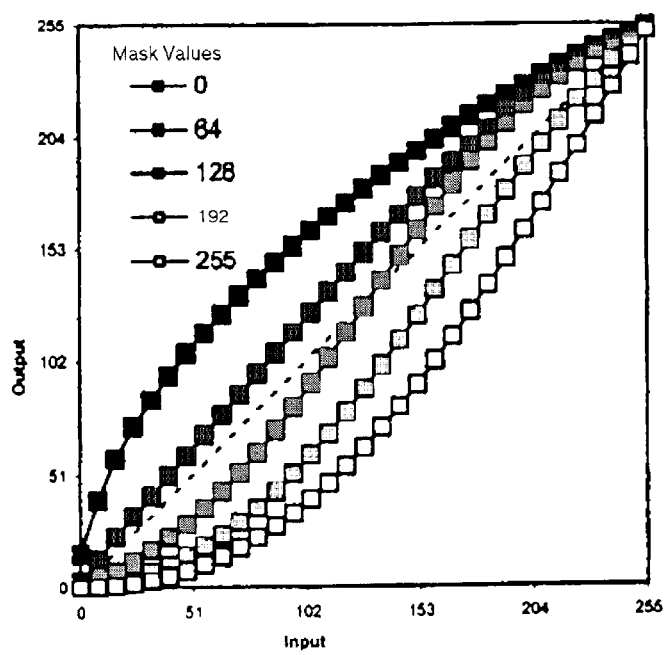
FIG. 9 illustrates several curves that show how input pixel values are mapped to output pixel color values depending on the particular mask values.

FIG. 9 illustrates a number of tone-reproduction curves resulting from Equation E and the specified values for n and k. The tone-reproduction curve representing the relationship between the output pixel values O and the input pixel values I are sigmoidal for middle grays and exponential for the extremes. Specifically, the tone-reproduction curve for a mask pixel value representing middle gray (i.e., M=128 for 8-bit color) is sigmoidal, as are those curves for mask pixel values representing shadows and highlights (i.e., M=64 and 170, respectively, for 8-bit color). The tone-reproduction curves for mask pixel values representing black and white (i.e., M=0 and 255, respectively, for 8-bit color) are exponential.

As mentioned above, parameters $p_1$ and $p_2$ may be varied to adjust the tone-reproduction curves. For example, in Equation E, $p_1$ enables adjustment of the slope of the curves, and $p_2$ enables adjustment of the span of the exponential envelope for mask pixel values representing white and black. In some embodiments, a default value for the parameters is the middle gray value (i.e., 128 for 8-bit color).

The implementation and operation discussion provided above in relation to Equation A applies equally to Equations B and E and will not be repeated herein.

Figure 10:
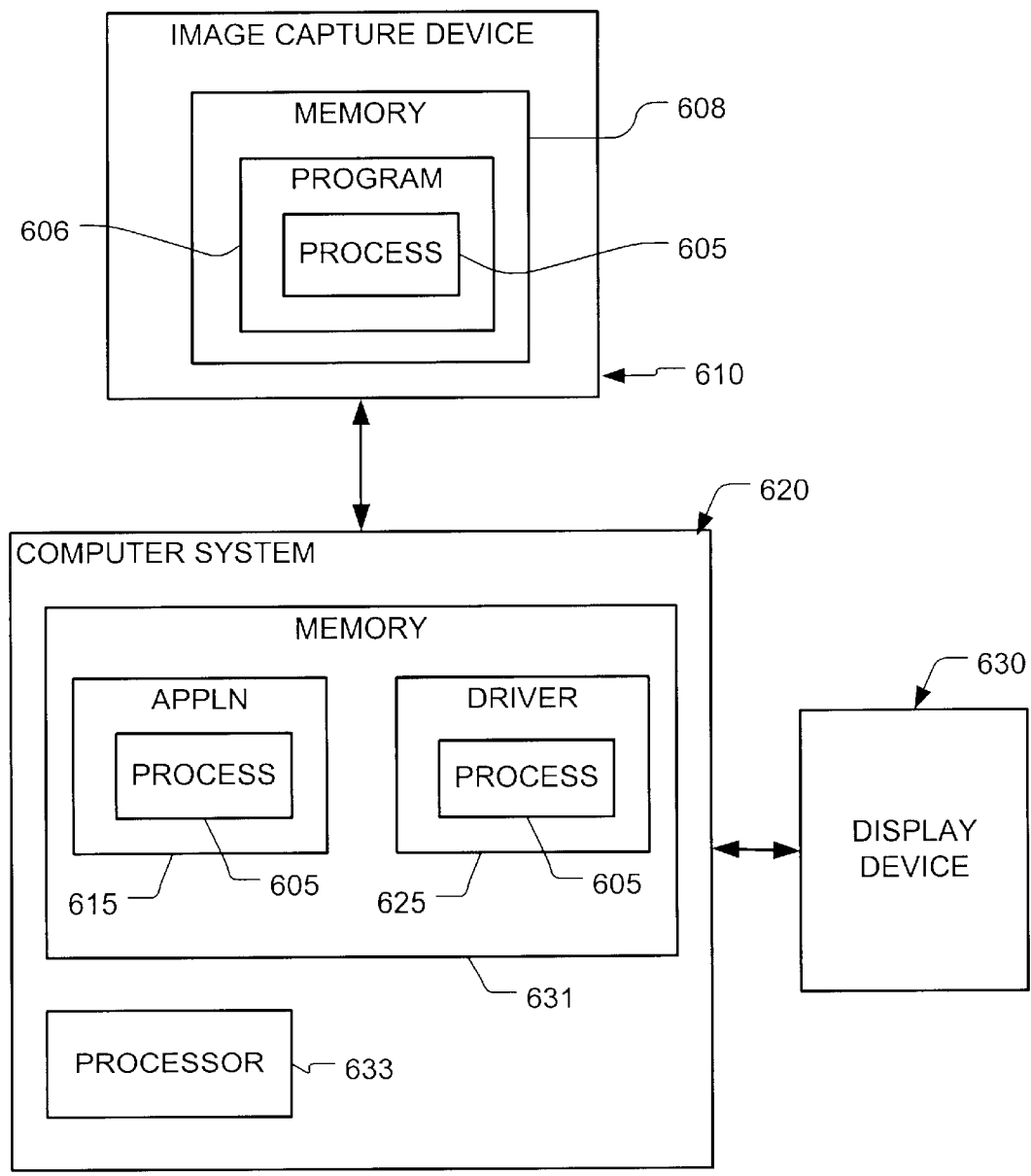
FIG. 10 illustrates an imaging system according to an embodiment of the invention.

The process can be implemented at several stages in an image-processing pipeline. FIG. 10 illustrates several such stages. An image-capturing device 610 (e.g., a digital camera or a scanner) can use the local-color-correction process 605 to improve the quality of the images captured by this device. The process 605 can be part of a program 606 stored in memory 608. The program 606 instructs a processor 609 to perform color correction. The color tone of images that were captured with uneven exposure or flash illumination can be corrected. Images having a high dynamic range can be processed.

After capturing an image, the capturing device 610 can quickly generate a tone mask for the image by performing the fast and efficient process 200 of FIG. 2. The capturing device can then use a look-up table (such as the one conceptually illustrated by FIG. 5) to quickly identify the modified pixel values for each component color. In other words, the capturing device 610 can use the original pixel values and the generated mask values as indices into the look-up table to retrieve modified pixel values.

As shown in FIG. 10, the local-color-correction process 605 can also be part of an application 615 stored in memory 631 of the computer system 620. When executed the application 615 instructs a processor 633 to perform color correction. The computer system 620 can run this application 615 to correct the color of an image captured by capturing device 610 or supplied by another application (such as a web browser application). The process 605 can also be implemented as part of a device driver 625 (such as a printer driver), so that the driver 625 performs local-tone correction on the image before the display device 630 displays the image.

The local color-correction technique has numerous advantages. For instance, the local correction can simultaneously lighten shadows and darken highlights, by using a simple pixel-wise "gamma" correction of the input data. Also, some embodiments balance global and local contrast changes and reduce chroma distortions by using an inverted, low-pass filtered, monochrome version of the original image as the tone mask.

In addition, performing the local color correction is simple and fast. A significant improvement in image quality relative to a global correction is achieved. Moreover, there is no need to rely on complicated visual models or masks.

The invention can be useful for enhancing or improving a several types of images. For example, conventional photography may yield an image in which one region of the image is underexposed while another region is correctly exposed. Flash photography is another instance in which one region in the image may be over-exposed while another is under-exposed. For these situations, a complex local correction technique based on the human visual system may be inappropriate. In addition, some image scenes have a wide dynamic range.

Lastly, the invention may be used to complement traditional pixel based processing. For example, once the color of an image is corrected, the image can be reproduced on a given printer using a traditional pixel based pipeline. Use of a neighborhood image processing technique for one part of the imaging pipeline does not exclude subsequent pixel based image processing. This suggests that pixel and neighborhood imaging operations could be used where appropriate to optimize the overall quality and speed of the imaging pipeline.

One embodiment of the invention is implemented by using the Adobe PhotoShop® application. Specifically, in this embodiment, this application can be used to (1) input an original image, (2) copy the original image into a second layer, (3) blur the image using the Gaussian blur filter with a radius of about 15, (4) invert the blurred image, (5) desaturate the blurred negative using the Hue/Saturation adjustment, and (6) use the Soft Light layer operator to combine the original and generated images to create the final image. Experimenting with the radius of the PhotoShop® blur filter shows how the overall image contrast is a function of the radius. In particular, the larger the radius the better the overall contrast, but if the radius is too large then the local tone correction has less of an effect.

Although the method was described in connection with a tone mask operation for modifying input pixel values, it is not so limited. More generally, the input pixel values may be locally modified according to local pixel neighborhoods. The pixel values may be locally modified by operations such as, without limitation, blurring, decimating, and median filtering. The tone mask is but one example. In the equations above, the value M would represent values of the locally modified pixels.

The invention is not limited to the specific embodiments described above. For instance, the invention is not limited to a single monochrome mask for modifying pixel values for all component colors. Separate masks for each component color may be used instead. Each of the masks can be optimized for its component color value.

Thus, the invention is not limited to the specific embodiments described and illustrated above. Instead, the invention is construed according to the claims that follow.

What is claimed is:

1. A method of processing an input image having a plurality of pixels each represented by a set of input pixel values, the method comprising:
   locally modifying the input pixel values according to pixel neighborhoods; and
   determining an output image having a set of output pixel values, wherein each set of output pixel values equals a non-linear combination of a set of input pixel values and its corresponding set of modified pixel values.

2. The method of claim 1, wherein an exponential operation is used to determine the set of output pixel values, the exponential operation using the set of input pixel values as part of its base and its exponent, and using the modified pixel values as part of its exponent.

3. The method of claim 1, wherein a minuend and a subtrahend are used to determine the set of modified values, the subtrahend including an exponential operation; the exponential operation using the set of input pixel values as part of its base and its exponent, and using the modified pixel values as part of its exponent.

4. The method of claim 3, wherein the minuend includes a constant equal to a maximum pixel value.

5. The method of claim 1, wherein an exponential operation is used to determine the set of output values, the exponential operation having a base and an exponent; the exponential operation using the set of input pixel values as part of its base, and using the corresponding modified pixel values as part of its base and its exponent.

6. The method of claim 5, wherein the exponential operation causes the output pixel values to have a sigmoidal relationship with the input pixel values when the modified pixel values have a value substantially representing middle gray.

7. The method of claim 6, wherein the exponential operation includes a variable parameter as part of its base for adjusting the sigmoidal relationship.

8. The method of claim 5, wherein the exponential operation is expressed as:

$$O = T \cdot \left[ \frac{|s-t|}{(1+s)(1-t)} \right]^b,$$

wherein O represents the output pixel values, T is a constant, s is a function of the input pixel values and the modified pixel values, t is a function of the modified pixel values, and b is a function of the modified pixel values.

9. The method of claim 1, wherein the input pixel values are modified by generating a tone mask.

10. An article comprising computer-readable memory encoded with the output pixel values of claim 1.

11. A method of modifying input pixel values of an image, the method comprising:
    modifying the input pixel values according to a pixel neighborhood; and
    generating output pixel values by applying a function to the input pixel values and the modified pixel values, the function causing one of a sigmoidal and hyperbolic relationship between the input pixel values and output pixel values when the corresponding modified pixel values represent middle grays.

12. The method of claim 11, wherein the function causes an exponential relationship between the input pixel values and the output pixel values when the modified pixel values represent white.

13. The method of claim 11, wherein the function causes an exponential relationship between the input pixel values and the output pixel values when the modified pixel values represent black.

14. The method of claim 11, wherein the function is expressed as $$O = T \cdot \left[ \frac{|s-t|}{(1+s)(1-t)} \right]^b,$$

wherein O represents the output pixel values, T is a constant, s is a function of the input pixel values and the modified pixel values, t is a function of the modified pixel values, and b is a function of the modified pixel values.

15. The method of claim 11, wherein the function includes a base and an exponent, the set of input pixel values used in the base and the exponent, and the corresponding modified pixel values used in the exponent.

16. The method of claim 11, wherein the input pixel values are modified by generating a tone mask.

17. The method of claim 11, wherein the relationship is sigmoidal.

18. The method of claim 11, wherein the relationship is hyperbolic.

19. A computer readable medium programmed with a set of instructions for enabling a computer to modify an input image having a plurality of pixels, the instruction set causing the computer to retrieve a set of input pixel values for each pixel of the input image; causing the computer to generate a set of mask pixel values for each set of input pixel values; and causing the computer to determine a set of output pixel values for each set of input pixel values, wherein each set of output pixel values equals a non-linear combination of a set of input pixel values and its corresponding set of mask pixel values.

20. The computer-readable medium of claim 19, wherein the instruction set causes the computer to use a non-linear operation to combine a set of input pixel values and its corresponding set of mask pixel values.

21. The computer-readable medium of claim 20, wherein the non-linear operation is an exponential operation having a base and an exponent; the exponential operation using the set of input pixel values as part of its base and its exponent, and using the corresponding set of mask pixel values as part of its exponent.

22. The computer-readable medium of claim 18, wherein the non-linear operation involves a minuend and a subtrahend, the subtrahend including an exponential operation; the exponential operation using the set of input pixel values as part of its base and its exponent, and using the corresponding set of mask pixel values as part of its exponent.

23. The computer-readable medium of claim 22, wherein the minuend includes a constant equal to a maximum pixel value.

24. The computer-readable medium of claim 21, wherein the exponential operation also uses the corresponding set of mask pixel values as part of the base.

25. The computer-readable medium of claim 21, wherein the exponential operation causes the modified pixel values to have a sigmoidal relationship with the input pixel values when the mask pixel values have a value substantially representing middle gray.

26. The computer-readable medium of claim 25, wherein the exponential operation causes an exponential relationship between the output pixel values and the input pixel values when the mask pixel values have a value substantially representing white.

27. The computer-readable medium of claim 25, wherein the exponential operation causes an exponential relationship between the output pixel values and the input pixel values when the mask pixel values have a value substantially representing black.

28. Apparatus for modifying an input image represented by a plurality of input pixel values, the apparatus comprising a processor for locally modifying the input pixel values according to pixel neighborhoods; and determining a set of output pixel values for each set of input pixel values, wherein each set of output pixel values equals a non-linear combination of a set of input pixel values and its corresponding set of modified pixel values.

29. The apparatus of claim 28, wherein the input pixel values are modified by generating a tone mask.

30. The apparatus of claim 28, wherein the processor uses a non-linear operation to combine a set of input pixel values and its corresponding set of modified pixel values.

31. The apparatus of claim 30, wherein the non-linear operation is an exponential operation having a base and an exponent; the exponential operation using the set of input pixel values as part of its base and its exponent, and using the corresponding set of modified pixel values as part of its exponent.

32. The apparatus of claim 30, wherein the non-linear operation involves a minuend and a subtrahend, the subtrahend including an exponential operation; the exponential operation using the set of input pixel values as part of its base and its exponent, and using the corresponding set of modified pixel values as part of its exponent.

33. The apparatus of claim 30, wherein the non-linear operation is an exponential operation having a base and an exponent; the exponential operation using the set of input pixel values as part of its base, and using the corresponding set of modified pixel values as part of its base and its exponent.

34. The apparatus of claim 33, wherein the exponential operation causes the output pixel values to have a sigmoidal relationship with the input pixel values when the modified pixel values have a value substantially representing middle gray.

35. The apparatus of claim 34, wherein the exponential operation causes an exponential relationship between the output pixel values and the input pixel values when the modified pixel values have a value substantially representing white.

36. The apparatus of claim 34, wherein the exponential operation causes an exponential relationship between the output pixel values and the input pixel values when the modified pixel values have a value substantially representing black.

37. The apparatus of claim 29, further comprising an image-capturing device for providing the input image.

38. Apparatus for color-correcting pixel values of an image, the apparatus comprising a processor for locally modifying the input pixel values according to pixel neighborhoods; and applying a function to the input pixel values according to corresponding modified pixel values, the function causing one of a sigmoidal and hyperbolic relationship between the input pixel values and the output pixel values when the modified pixel values represent middle grays.

39. The apparatus of claim 38, wherein the function causes an exponential relationship between the input pixel values and the output pixel values when the modified pixel values of the tone mask represent white.

40. The apparatus of claim 38, wherein the function causes an exponential relationship between the input pixel values and the output pixel values when the modified pixel values represent black.

41. The apparatus of claim 38, wherein the function is expressed as $$O = T \cdot \left[ \frac{|s-t|}{(1+s)(1-t)} \right]^b,$$

wherein O represents the output pixel values, T is a constant, s is a function of the input pixel values and the modified pixel values, t is a function of the modified pixel values, and b is a function of the modified pixel values.

42. The apparatus of claim 38, wherein the function includes a base and an exponent, the set of input pixel values used in the base and the exponent, and the corresponding set of modified pixel values used in the exponent.

43. The apparatus of claim 38, wherein the processor uses the input pixel values to generates a tone mask, the tone mask containing the modified pixel values.

44. Apparatus for modifying input pixel values of a digital image, the apparatus comprising:
   means for locally modifying the input pixel values according to pixel neighborhoods; and
   means for determining a set of output pixel values for each set of input pixel values, wherein each set of output pixel values equals a non-linear combination of a set of input pixel values and its corresponding set of modified pixel values.

* * * * *